(12) United States Patent
Gila et al.

(10) Patent No.: US 7,835,043 B2
(45) Date of Patent: *Nov. 16, 2010

(54) IMAGING DEVICE AND CALIBRATION METHOD THEREFOR

(75) Inventors: Omer Gila, Cupertino, CA (US); Doron Shaked, K. Tivon (IL); Shlomo Harush, Nez Ziyonaz (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 687 days.

This patent is subject to a terminal disclaimer.

(21) Appl. No.: 11/516,310

(22) Filed: Sep. 6, 2006

(65) Prior Publication Data

US 2008/0055666 A1 Mar. 6, 2008

(51) Int. Cl.
*G06K 1/00* (2006.01)
*H04N 1/46* (2006.01)
(52) U.S. Cl. ...................... 358/504; 358/1.9
(58) Field of Classification Search ............... 358/504, 358/1.1–1.9, 474, 518
See application file for complete search history.

(56) References Cited

U.S. PATENT DOCUMENTS

| | | | |
|---|---|---|---|
| 578,667 A | 3/1897 | Meshta et al. | |
| 5,107,332 A | 4/1992 | Chan | |
| 5,272,518 A | 12/1993 | Vincent | |
| 5,381,349 A | 1/1995 | Winter et al. | |
| 5,450,165 A | 9/1995 | Henderson | |
| 5,537,516 A * | 7/1996 | Sherman et al. | 358/1.9 |
| 5,671,059 A | 9/1997 | Vincent | |
| 5,689,350 A | 11/1997 | Rolleston | |
| 5,760,913 A | 6/1998 | Falk | |
| 5,809,213 A * | 9/1998 | Bhattacharjya | 358/1.6 |
| 5,818,960 A | 10/1998 | Gregory, Jr. et al. | |
| 6,008,907 A | 12/1999 | Vigneau et al. | |
| 6,031,628 A | 2/2000 | Jacob et al. | |
| 6,048,117 A | 4/2000 | Banton | |
| 6,535,307 B1 * | 3/2003 | Allen et al. | 358/504 |
| 6,585,340 B1 | 7/2003 | Borrell | |
| 6,840,597 B1 | 1/2005 | Wilson et al. | |
| 6,941,323 B1 * | 9/2005 | Galperin | 707/104.1 |
| 7,016,077 B2 * | 3/2006 | Semba et al. | 358/1.9 |
| 7,023,584 B2 * | 4/2006 | Cowan et al. | 358/1.9 |
| 7,161,562 B1 * | 1/2007 | Hunt | 345/32 |
| 7,312,779 B1 * | 12/2007 | Blevins | 345/102 |
| 7,729,422 B2 * | 6/2010 | Wilensky | 375/240.01 |
| 7,747,154 B2 * | 6/2010 | Silverbrook | 396/57 |
| 2002/0171866 A1 * | 11/2002 | Parry et al. | 358/1.15 |
| 2003/0035128 A1 * | 2/2003 | Phillips et al. | 358/1.14 |
| 2005/0018219 A1 * | 1/2005 | Senn et al. | 358/1.8 |
| 2005/0168559 A1 * | 8/2005 | LeVake et al. | 347/122 |
| 2006/0028682 A1 * | 2/2006 | Haines | 358/1.15 |
| 2006/0039707 A1 * | 2/2006 | Mima | 399/23 |
| 2006/0087665 A1 * | 4/2006 | Wang | 358/1.9 |
| 2006/0193017 A1 * | 8/2006 | Zuber | 358/504 |
| 2006/0232806 A1 * | 10/2006 | Holub | 358/1.9 |

FOREIGN PATENT DOCUMENTS

| | | |
|---|---|---|
| EP | 1385330 | 1/2004 |
| EP | 1641243 | 3/2006 |

\* cited by examiner

*Primary Examiner*—Jerome Grant, II

(57) ABSTRACT

An imaging device and calibration method therefore forms a plurality of hard images upon media using user-defined image data. An optical characteristic of at least a portion of the hard images is sensed at a plurality of different spatial locations of the hard images. The sensed optical characteristic is compared with the user-defined image data, and the imaging device is calibrated using the sensed optical characteristic.

24 Claims, 9 Drawing Sheets

IMAGING DEVICE AND CALIBRATION METHOD THEREFOR

BACKGROUND

The present invention generally relates to imaging devices and, more particularly, to a system and method for calibration of imaging devices during the imaging process, and imaging devices utilizing the system and method.

Imaging devices capable of printing color images upon paper and other media are becoming increasing popular and used in many applications for color reproduction of images. For example, laser printers, ink jet printers, and digital printing presses are but a few examples of imaging devices in wide use today. As used herein, the term "imaging device" generally refers to all types of devices used for creating a printed image upon media.

As the use of color imaging devices continues to increase, the demand for quality color image reproduction has also increased for at least some imaging applications. For example, it is desirable in some color imaging applications to consistently generate color images of acceptable color consistency which may be considered to be one of the most important print quality characteristics. The demands may require spatial color consistency wherein colors are reproduced substantially the same over a given sheet of media. In addition, for applications where relatively high volumes of an image are generated, constant color consistency over time for many sheets of media may be desirable or of paramount importance. It may also be desirable or important to generate color images which match or are substantially the same as the images provided by a monitor, scanner, camera, other imaging devices, or otherwise provided for reproduction.

In one imaging example, a plurality of versions of the same image may be replicated on a single sheet of paper which is also reproduced in relatively high volumes by the same or different imaging devices (e.g., printing business cards). It is desirable to provide color consistency between the images on the same sheet of paper, as well as with respect to images on other sheets of paper from the same imaging device, and with respect to images from different imaging devices. Color consistency is dependent upon numerous physical parameters, such as consumables (photoconductor, marking agents, media, etc.), temperature, humidity, pressures, etc.

Color consistency is maintained in different manners. In some systems, predetermined color patches are periodically printed by the imaging device and inspected for color accuracy. The imaging device is then calibrated to correct any detected errors in color accuracy. However, such practices are often insufficient to provide the desired or required level of color consistency. In particular, color patch calibration is typically conducted infrequently due to consumable waste caused by the calibration, and due to the interruption of the workflow. Even if calibration is conducted between each job run, color drift within a job run is not corrected. Periodic calibration also fails to compensate for transient parameter variations that typically occur in the beginning of a job run (changing temperature, humidity, etc.), but which stabilize after a period of time. Also, it is often impractical to conduct a full color calibration every time a consumable (e.g., paper, ink, etc.) is changed.

The disclosure provides systems and methods which provide improvements with respect to color imaging, including improved color consistency.

SUMMARY

The invention described herein provides an imaging device and calibration method therefore. In one embodiment the method comprises: forming a plurality of hard images upon media with an imaging device using user-defined image data, the hard images corresponding to the user-defined image data; sensing an optical characteristic of at least a portion of the hard images at a plurality of different spatial locations of the hard images; comparing the sensed optical characteristic with the user-defined image data; and calibrating an imaging operation of the imaging device with respect to forming the hard images using the sensed optical characteristic.

DETAILED DESCRIPTION

In the following detailed description, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following description, therefore, is not to be taken in a limiting sense, and the scope of the present invention is defined by the appended claims.

The disclosure relates to methods and devices for monitoring and implementing imaging operations of hard images upon media, such as paper. In one embodiment, an optical characteristic of one or more marking agent forming the hard image may be monitored. An exemplary optical characteristic is optical density (OD). A densitometer is one possible configuration to implement sensing of optical density of the hard image. Additional details regarding sensing of hard images using a densitometer are described in co-pending commonly assigned U.S. patent application Ser. No. 10/658,939, filed Sep. 9, 2003, entitled "Densitometers And Methods For Measuring Optical Density", listing Omer Gila and William David Holland as inventors, having U.S. Patent Publication No. 2005/0052654, published on Mar. 10, 2005, the disclosure of which is incorporated herein by reference. At least some of the embodiments herein disclose a sensor assembly including a plurality of densitometers configured to monitor a plurality of different spatial regions or locations of a hard image formed upon media. Additional details regarding sensor assemblies configured to monitor a plurality of different spatial regions or locations of a hard image are described in co-pending commonly assigned U.S. patent application Ser. No. 11/250,784, filed Oct. 13, 2005, entitled "Imaging Methods, Imaging Device Calibration Methods, Imaging Devices, and Hard Imaging Device Sensor Assemblies", listing Omer Gila, William David Holland, Eyal Shelef and Shlomo Harush as inventors, the disclosure of which is incorporated herein by reference.

Figure 1:
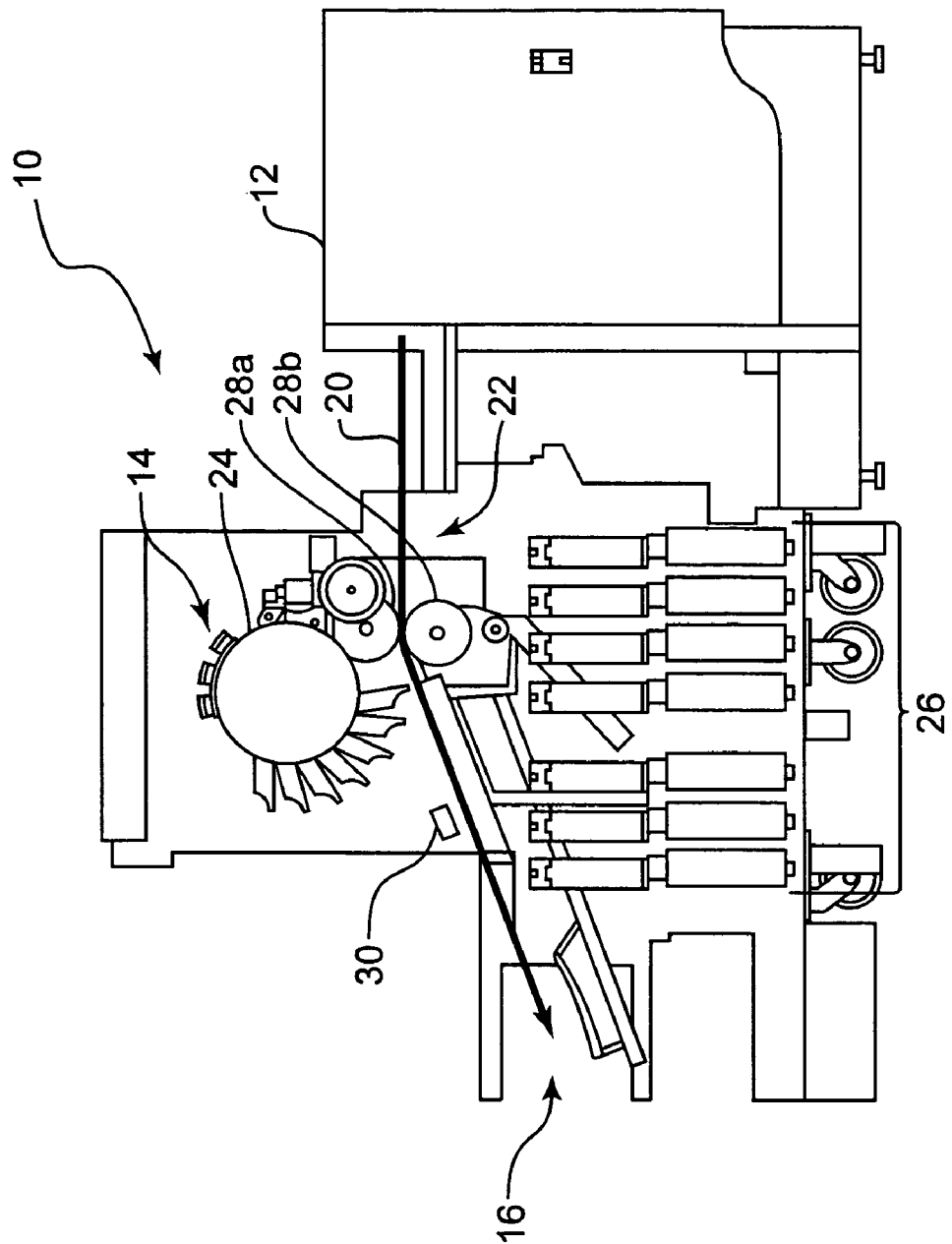
FIG. 1 is an illustrative representation of an imaging device according to one embodiment.

Referring to FIG. 1, details regarding an exemplary configuration of an imaging device 10 configured to implement imaging operations according to one embodiment are shown. In one embodiment, imaging device 10 may be a digital imaging device configured to access or generate digital image data to form hard color images upon media, such as paper, labels, transparencies, etc. For example, the imaging device 10 may be configured as a digital press, such as an HP Indigo 5000 digital printing press available from Hewlett-Packard Company, in one exemplary arrangement.

Imaging device 10 includes a media feed unit 12, an image engine 14 and an output handling unit 16 in the depicted exemplary configuration. Media is transferred along a media path 20 from media feed unit 12 to image engine 14 for the formation of hard images and subsequently outputted to output handling unit 16.

In the depicted embodiment, image engine 14 is configured to implement electrophotographic imaging operations to form latent images responsive to image data and develop the latent images using marking agents of a plurality of different colors. Other configurations of image engine 14 for forming images upon media are possible. In one implementation, image engine 14 uses a photoconductive drum 24 to form and develop latent images using the marking agents. The described exemplary image engine 14 receives the marking agents from a plurality of reservoirs 26 configured to store the marking agents of the different colors. The marking agents are liquid inks in the described embodiment, although other types of marking agents may be used in other embodiments. The developed color images are transferred from photoconductive drum 24 via imaging drums 28 to media (not shown in FIG. 1) within the media path 20. The imaging drum 28a adjacent to the photoconductor 24 may be referred to as a blanket drum, and the imaging drum 28b adjacent to the media path 20 may be referred to as an impression drum.

A sensor assembly 30 is positioned downstream of image engine 14 along media path 20 and is configured to monitor hard images formed upon media by image engine 14 or otherwise provided within media path 20. In other embodiments, sensor assembly 30 may be positioned at other locations (e.g., positioned and configured to monitor images upon photoconductor 24). Sensor assembly 30 may be referred to as an "inline" sensor.

Figure 2:
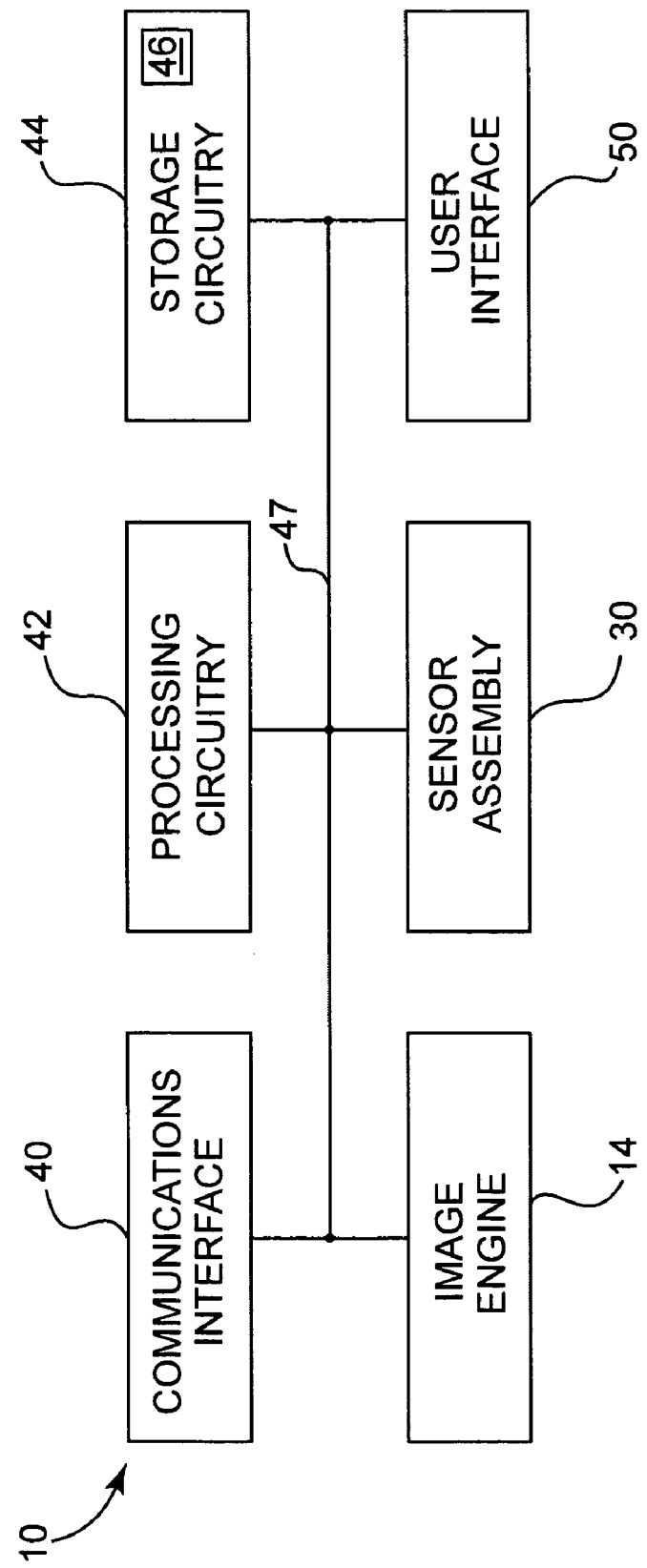
FIG. 2 is a functional block diagram of the imaging device of FIG. 1 according to one embodiment.

Referring now to FIG. 2, additional components of exemplary imaging device 10 are depicted according to one embodiment. Imaging device 10 includes a communications interface 40, processing circuitry 42, storage circuitry 44, and a user interface 50 electrically coupled with one another and with image engine 14 and sensor assembly 30, for example, via a communications bus 47. Other configurations are possible including more, less and/or alternative components.

Communications interface 40 is configured to implement communications of imaging device 10 with respect to external devices (not shown). For example, communications interface 40 may be configured to communicate information bi-directionally with respect to external devices. Communications interface 40 may be implemented as a network interface card (NIC), serial or parallel connection, USB port, Firewire interface, flash memory interface, floppy disk drive, or any other suitable arrangement for communicating with respect to imaging device 10. According to some implementations, communications interface 40 may be coupled with a host or a network. In another implementation, imaging device 10 may operate as a stand-alone imaging device without a host or network.

In one embodiment, processing circuitry 42 is arranged to process data (e.g., access and process digital image data corresponding to a color image to be formed as a hard image upon media), control data access and storage, issue commands, monitor imaging operations and/or control imaging operations (e.g., control imaging operations and/or implement calibration operations responsive to monitoring as described below in exemplary embodiments). Processing circuitry 42 may comprise circuitry configured to implement desired programming provided by appropriate media in at least one embodiment. For example, processing circuitry 42 may be implemented as one or more of a processor and/or other structure configured to execute executable instructions including, for example, software and/or firmware instructions, and/or hardware circuitry. Exemplary embodiments of processing circuitry 42 include hardware logic, PGA, FPGA, ASIC, state machines, and/or other structures alone or in combination with a processor. These examples of processing circuitry 42 are for illustration, and other configurations are possible.

The storage circuitry 44 is configured to store programming such as executable code or instructions (e.g., software and/or firmware), electronic data (e.g., image data), databases, look up tables, or other digital information useful to the operation of imaging device 10, and may include processor-usable media. Processor-usable media includes any computer program product or article of manufacture 46 that can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry 44 described above and/or communicated via a network or using other transmission media and configured to control appropriate processing circuitry 42. For example, programming may be provided via appropriate media including for example articles of manufacture 46, embodied within a data signal (e.g., modulated carrier wave, data packets, digital representations, etc.) communicated via an appropriate transmission medium, such as a communications network (e.g., the Internet and/or a private network), wired electrical connection, optical connection and/or electromagnetic energy, for example, via communications interface 40, or provided using other appropriate communication structure or medium. Exemplary programming including processor-usable code may be communicated as a data signal embodied in a carrier wave in but one example.

User interface 50 is configured to interact with a user, including conveying data to a user (e.g., displaying data for observation by the user, audibly communicating data to a user, etc.) as well as receiving inputs from the user (e.g., tactile input, voice instruction, etc.). Accordingly, in one exemplary embodiment, the user interface 50 may include a display (e.g., cathode ray tube, LCD, etc.) configured to depict visual information and an audio system as well as a keyboard, mouse and/or other input device. Any other suitable apparatus for interacting with a user may also be utilized.

As will be described in greater detail below, imaging device 10 combines inline color measurement (via sensor assembly 30) with job and measurement analysis and a color feedback algorithm. The job and measurement analyses indicates whether the measured color of the hard image (i.e., the printed image) is within color consistency tolerances, and the color feedback algorithm adjusts or calibrates imaging device 10 to maintain the measured color within the tolerances.

As will be understood from the description below, the methods and apparatus described herein may be used in several different manners. In one embodiment, the methods and apparatus may be used to provide a relative color consistency, where colors are maintained relative to a proof image. In another embodiment, the methods and apparatus may be used to provide an absolute color consistency, where colors are maintained relative to an absolute measure, and the imaging device with maintained within the color specification. In yet another embodiment, the methods and apparatus may be used to maintain a color or set of colors (e.g., key colors) absolutely or relative to a proof image across a set of jobs and/or imaging devices.

Maintaining color consistency relies on several components: a) reliable and consistent inline color measurement; b) job analysis indicating locations where color measurements are reliable or important; c) tolerance levels that keep color variations below a visibility threshold; d) mapping between the measured image colors and the job description of the image colors; and e) a feedback algorithm to maintain measured image colors within the tolerance levels. These various components are discussed in greater detail below.

Inline Color Measurement

As mentioned above, sensor assembly 30 is configured to monitor hard color images provided upon media. Sensor assembly 30 senses a hard color image and provides electrical signals indicative of an optical characteristic of the hard image at one or more spatial locations of the image. An exemplary optical characteristic is optical density, and in one embodiment sensor assembly 30 comprises one or more densitometers. In other embodiments, other optical characteristics instead of or in addition to optical density may be monitored by sensor assembly 30, and sensor assembly 30 may comprise, for example, photometers, calorimeters, or other optical sensors as are known in the art.

The optical characteristic monitored by sensor assembly 30 is used in monitoring imaging and/or improving color consistency of hard images formed by image engine 14. Processing circuitry 42 uses signals from sensor assembly 30 to calculate the optical characteristic at the respective location (s) of the hard color image. Processing circuitry 42 implements calibration operations, adjusts imaging operations and/ or performs other desired actions using the output from sensor assembly 30 in possible embodiments as described further below.

Figure 3:
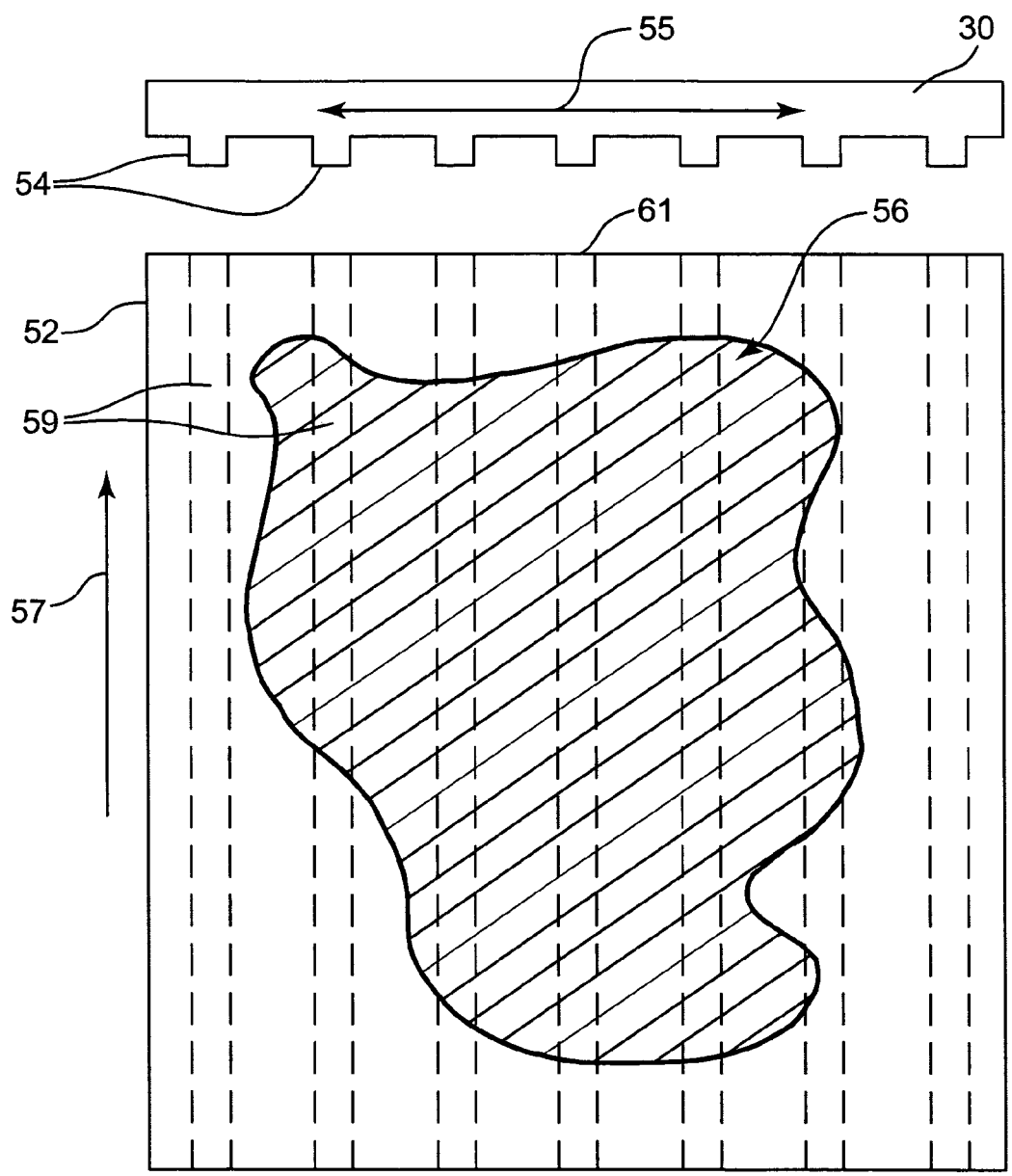
FIG. 3 is an illustrative representation of a sensor assembly and media having a hard color image thereon according to one embodiment.

Referring to FIG. 3, operations of an exemplary sensor assembly 30 are shown with respect to an exemplary sheet of media 52 having a hard color image (generally shown as image 56) formed thereon by image engine 14. Hard color image 56 comprises an image corresponding to user-defined image data (e.g., photographs, brochures, labels, postcards, calendars, business cards, etc.). Notably, hard color image 56 is not a predefined pattern, where "predefined" is construed to mean the contents of the image 56 are stored in storage circuitry 44 prior to shipment of imaging device 10 from a manufacturing facility or otherwise provided prior to on-the-fly imaging of at least some image jobs including jobs defined by a user. As used herein, a "user-defined" image or image data is not a "predefined" image or image data, and is specifically not an image whose only function is to calibrate the imaging device 10. One example of a "predefined" image whose only function is to calibrate the imaging device is a color calibration patch as described, for example, in the above-referenced co-pending commonly assigned U.S. patent application Ser. No. 11/250,784, filed Oct. 13, 2005, entitled "Imaging Methods, Imaging Device Calibration Methods, Imaging Devices, and Hard Imaging Device Sensor Assemblies", the disclosure of which is incorporated herein by reference.

In the depicted embodiment of FIG. 3, sensor assembly 30 includes a plurality of sensors 54. Sensors 54 are optically coupled with different spatial locations or regions of hard color image 56 and media 52 in the depicted example. More specifically, sensors 54 are positioned and arranged in a spaced relationship along a scan direction 55 of image engine 14 in the embodiment of FIG. 3 (e.g., scan direction 55 may correspond to a scanning direction of a laser of image engine 14 in an exemplary electrophotographic imaging arrangement). In the exemplary embodiment, scan direction 55 extends across media 52 and is generally transverse to the process direction 57 corresponding to the direction of movement of media 52 along media path 20. As media 52 moves in process direction 57, each sensor 54 continuously scans the length of media 52 along a respective scan path 59. It should be noted that in FIG. 3, the width of scan paths 59 is greatly exaggerated for purposes of illustration. In the illustrated embodiment, seven sensors 54 are spaced evenly across media 52. More or less than seven sensors 54 may be provided, and different spacing of sensors 54 may be used in other embodiments.

Sensors 54 are configured to sense an optical characteristic or parameter of the hard color image 56 at their corresponding respective spatial locations. In one embodiment, sensors 54 are configured as densitometers configured to provide information regarding the optical characteristic including optical density. Sensors 54 may individually include one or more light emission devices (not shown), such as light emitting diodes (LEDs), configured to emit light beams of different wavelengths of light. The wavelength of light emitted by the light emission devices corresponds to the color of the hard color image 56 being sensed. For example, light emission devices of sensors 54 can be configured to emit red, green or blue light to sense cyan, yellow or magenta colors in hard color image 56. In one embodiment, sensors 54 include light emission devices configured to emit wavelengths to sense cyan, magenta, yellow and black colors in hard color image 56. Light emission devices of sensors 54 may be configured to emit light of more, less and/or alternative wavelengths in other embodiments. In one embodiment, sensors 54 monitor and quantify the color of hard color image 56 using standard units like Optical Density T status.

Figure 4:
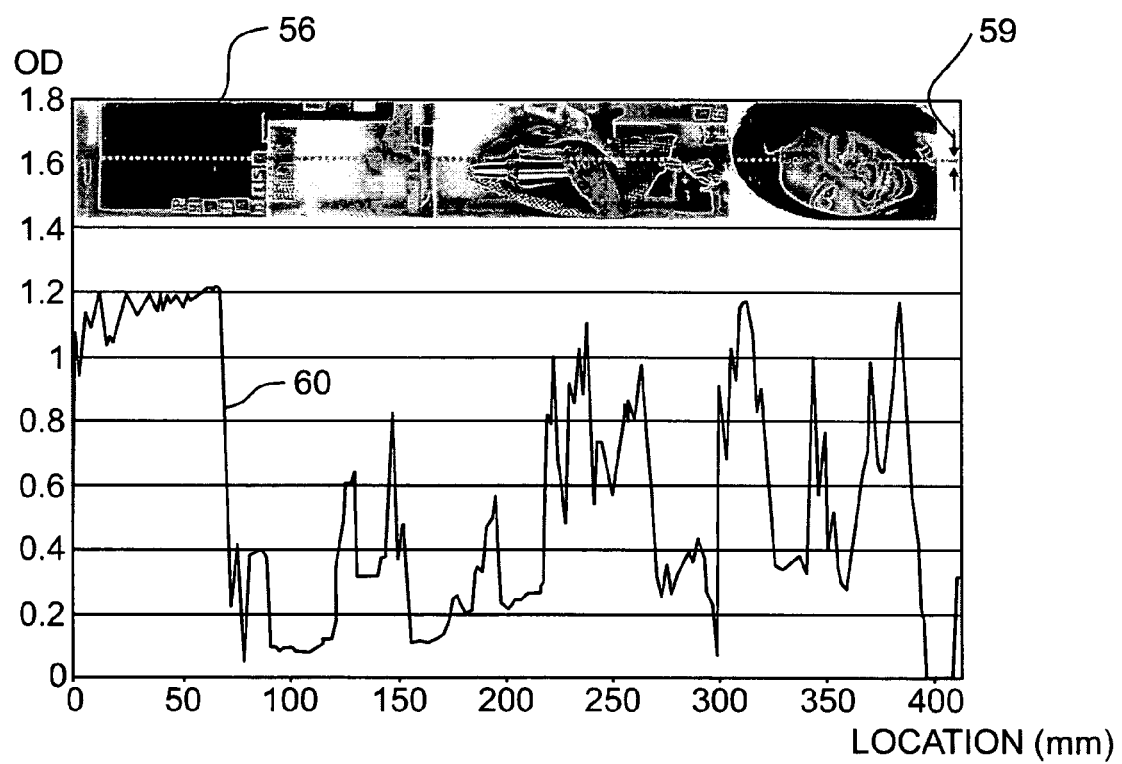
FIG. 4 is an illustrative representation showing exemplary sensing of an optical characteristic of a hard color image according to one embodiment.

Referring to FIG. 4, an exemplary representation showing results of sensing of an optical characteristic of a hard color image. In particular, a portion of an image 56 associated with one of scan paths 59 in FIG. 3 is depicted, and a corresponding optical density (OD) profile 60 obtained by a sensor 54 using a blue LED is shown. As used herein and unless otherwise specifically noted, the terms "profile", "optical characteristic profile", "optical density profile", etc., refer to a profile of an optical characteristic of the print job itself, as opposed to a profile of an optical characteristic of the imaging device (i.e., the "machine profile"). As is known in the art, a machine profile is generally performed only after, for example, changing consumables such as ink or paper.

Processing circuitry 42 processes the output of sensors 54 to determine or provide information regarding the optical characteristic of the respective locations or regions of hard color image 56. In some embodiments, a plurality of outputs of the same sensor 54 may be averaged or statistically manipulated to determine the optical characteristic.

Job Analysis

Available LED-based in-line densitometers (ILD) can provide consistent and reliable measurement of the optical density of an image. In addition, for reliable color calibration, processing circuitry 42 needs to be able to identify controllable locations of the image where measurements of optical characteristics provide reliable information (e.g., where the hard color image 56 is present and constant or nearly constant along one or more of scan paths 59). In the embodiment where sensors 54 are densitometers, to identify reliable locations, the expected measurement variations are modeled using color profile mapping of CMYK (Cyan, Magenta, Yellow, Black) digital image data to optical density quadruples and L*a*b* color space values. A CMYK print job can be translated to optical density values and averaged by a model of the densitometer aperture blur to obtain expected optical density measures. To estimate measured variations in a particular location, the expected optical density measures in a perpendicular interval across the scan path 59 are compared and pulled further apart by an amount corresponding to the optical density measurement noise. The expected optical density values can then be translated to L*a*b* values to compute ΔE. ΔE is a measure of color difference, namely the Euclidean distance or the straight line distance between two colors that are expressed by the L*a*b* coordinates. If the ΔE value is below a predetermined acceptability tolerance (e.g., 0.5), the location is considered to be reliable and measurements from that location can be used.

Figure 5:
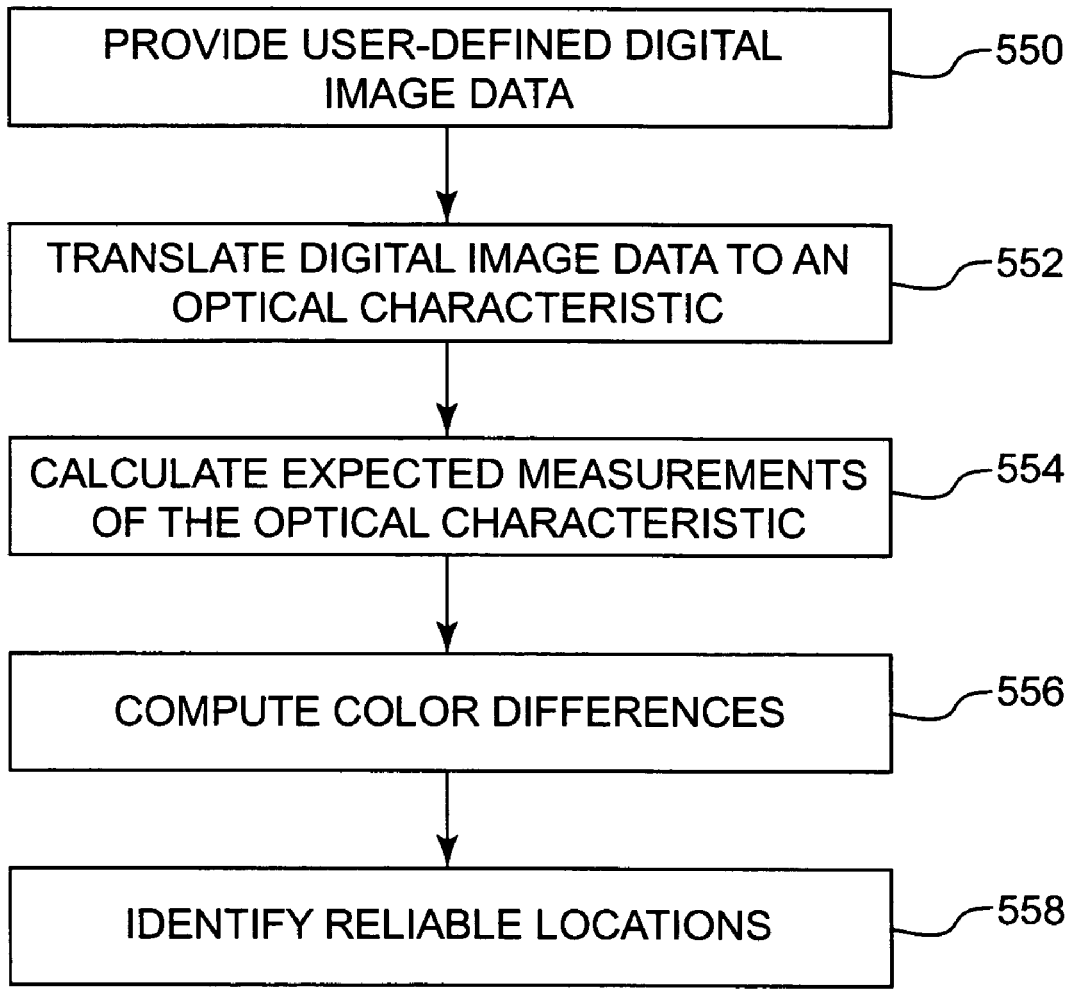
FIG. 5 is a flowchart of an exemplary method of analyzing a print job.

Referring to FIG. 5, an exemplary method which may be performed with respect to a job is illustrated. The depicted flow chart illustrates exemplary operations with respect to identifying controllable locations of an image where measurements of optical characteristics provide reliable information.

At a step 550, user-defined digital image data is provided.

At a step 552, a color profile of the digital image data is translated and mapped to an optical characteristic, such as optical density, of the image.

At a step 554, expected measurements of the optical characteristic at one or more locations are calculated.

At a step 556, expected measurements of the optical characteristic are translated to compute color differences.

At a step 558, locations having color differences below a predetermined level are identified as reliable locations.

Setting Tolerances

In setting tolerances for color variation of the hard color image 56, the color profile mapping between optical density and L*a*b* color space as described above may be used to determine an optical density color box such that all optical density values in that box are within the ΔE tolerance required to keep colors of hard color image 56 within visible color variation requirements.

Measurement Mapping

The first time a job is printed, it is usually printed in a proof mode. An optical density profile (as in FIG. 4) of the proof image is saved as part of the job description for further reference during production. The optical density profile becomes permanent when the proof image is approved by the user. The saved optical density profile of the proof image is compared to the optical density profile obtained from the digital image data as described above. In this manner, reliable color monitoring locations obtained in the job analysis are translated from the digital image data optical density profile to the proof optical density profile. Optical density profiles measured during production are then matched and compared to the proof optical density profile.

Measured optical density profiles of production images will be similar, but not identical, to each other and to the optical density profile obtained from the digital image data, as described above. To match locations on the different optical density profiles, boundaries of media 52 are detected and locations mapped linearly between the media boundaries. For example, referring again to FIG. 3, a leading edge 61 of media 52 may be used to synchronize the operations of sensor assembly 30 with respect to movement of the media 52 along media path 20, as well as for implementing at least one of the calibration operations of the imaging device 10 discussed below. In other embodiments, in addition to or instead of sensing boundaries of media 62, edges of the hard image may be sensed. In one embodiment, variations in optical density profiles may be accommodated by employing mapping methods established and known in digital communication, such as the Viterbi algorithm.

Feedback Management

The translation or map between CMYK color values and measured optical density as described above can be used to adjust or calibrate imaging device 10 when measured optical density drifts out of predetermined bounds. In particular, although some parameter of imaging device 10 has changed from a nominal value to cause the measured optical density to drift, changes in the map are generally smooth, and may be locally approximated by a constant change. Thus, gradients of a new map (correcting for changes in measured optical density) are assumed to remain the same as those of the reference map developed in a nominal imaging device state. The difference between the target optical density value and the measured optical density value constitutes a direction in the optical density measurement space, which translates to a direction in the CMYK space. Therefore, maintaining the measured optical density within predetermined bounds is accomplished by changing the actual CMYK values printed. In one embodiment, changing the actual CMYK values printed may be accomplished by modifying or changing at least one physical parameter of the imaging device 10, by modifying or changing the machine color look-up table (LUT), or both. Exemplary descriptions of calibration of an imaging device by modifying or changing at least one physical parameter of the imaging device, by modifying or changing the machine color look-up table (LUT), or both, are found in above-referenced co-pending and commonly assigned U.S. Patent Publication No. 2005/0052654 entitled "Densitometers And Methods For Measuring Optical Density", the disclosure of which is incorporated herein by reference.

As described herein, imaging device 10, via sensor assembly 30, continuously monitors an actual optical characteristic such as optical density of the hard color images as the images are formed, and corrects color inconsistencies in real time as they are detected. Imaging device 10 thereby provides improved color consistency of the hard color images.

Figure 6:
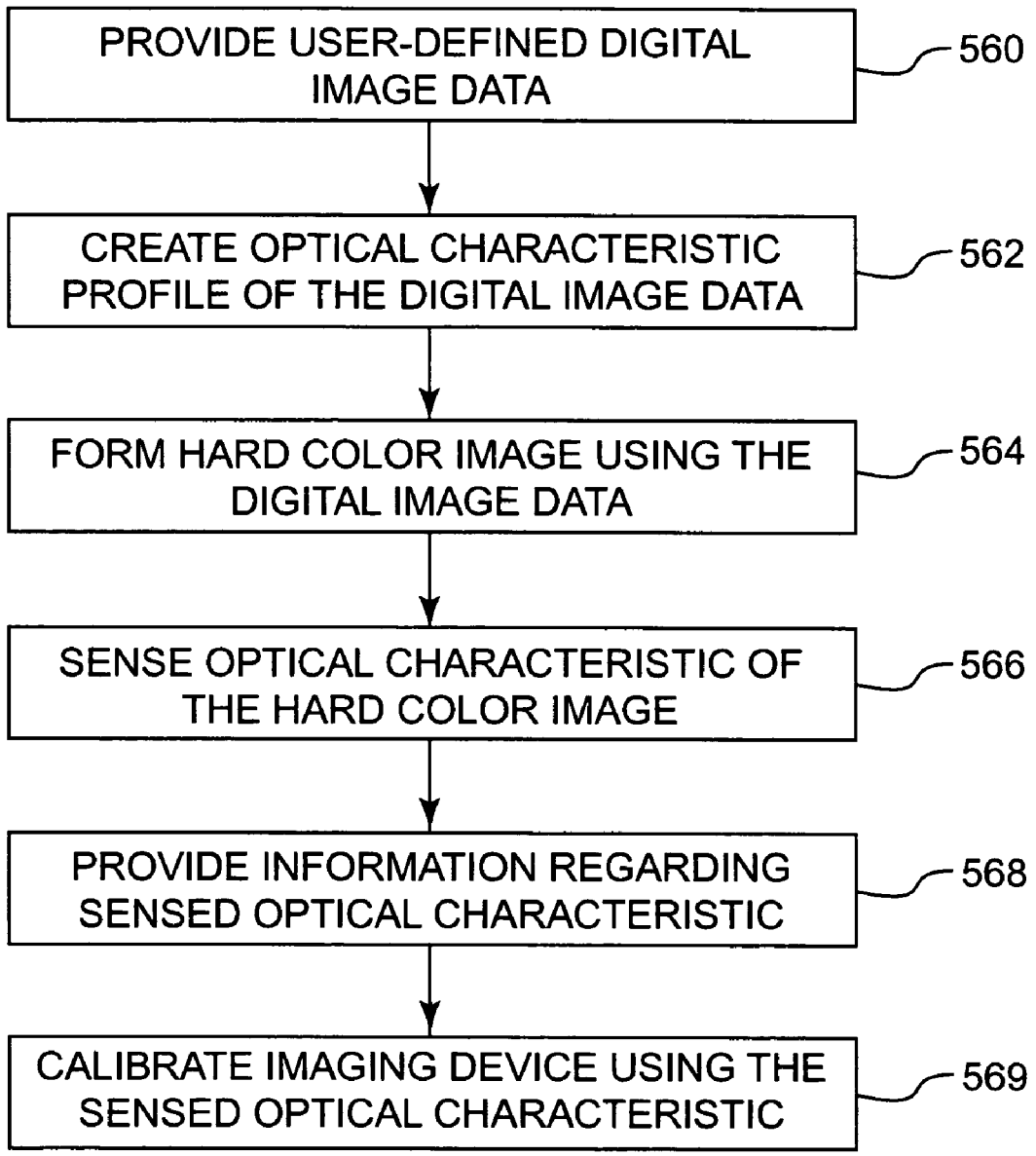
FIG. 6 is a flowchart of an exemplary method of providing color consistency in a print job.

Referring to FIG. 6, an exemplary method which may be performed with respect to imaging device 10 is shown. The depicted flow chart illustrates exemplary operations with respect to monitoring of hard images and adjustment or calibration of the imaging device 10 responsive thereto. Other methods are possible for monitoring and/or adjusting imaging device 10.

At a step 560, user-defined digital image data is provided to an imaging device.

At a step 562, an optical characteristic profile of the digital image data is created, such as optical density profile.

At a step 564, a hard color image is formed by the imaging device using the user-defined digital image data.

At a step 566, the optical characteristic, such as optical density, of the hard color image is sensed. In one embodiment, the optical characteristic may be sensed at a plurality of locations of the hard color image.

At a step 568, information regarding the optical characteristic is provided responsive to the sensing of step S66.

At a step 569, information regarding the sensed optical characteristic is used to calibrate the imaging device 10. For example, in one embodiment, information regarding the optical characteristic may be used to implement calibration operations, adjust imaging operations and/or perform other desired actions with respect to imaging device 10.

Relative Color Consistency Applications

As noted above, in one embodiment, the methods and apparatus described herein are used to provide a relative color consistency, where colors in a hard image are maintained relative to a proof image.

As described above, job analysis of the user-defined digital image data determines the controllable and reliable locations of the image to be printed. If the controllable and reliable regions are not sufficient (e.g. scan paths 59 travel only over white regions), the relative color consistency feature is unavailable. Otherwise, an optical density profile based on the digital image data is added to the job description. After determining the optical density profile based on the digital image data, the first print is a proof print, whereby a measured optical density profile is appended to the job description. As described above, optical density tolerances are added to the profile in locations where the job analysis indicated colors are controllable and reliable.

Subsequent prints are either proof prints or production prints. Optical density profiles for production prints are compared against the proof optical density profile in locations indicated by the job analysis. When the measured optical density starts to drift away from the target values, the color feedback mechanism is used to modify the color LUTs. In one embodiment, a color consistency warning is issued when controlled colors are out of tolerance bounds. In one embodiment, a further warning is issued if and when the imaging device 10 fails to adjust or calibrate the colors to bring them back within tolerances.

In one embodiment, during production, the imaging device operator may periodically replace the existing proof optical density profile with the optical density profile of a more recent print. In this manner, a formal proof print is not required, and colors of the hard images can be calibrated on the fly as they are observed by the operator. Alternatively, if a formal proof print is desired, the proof optical density profile may be fixed to prevent subsequent proof optical density profiles for the job.

Figure 7:
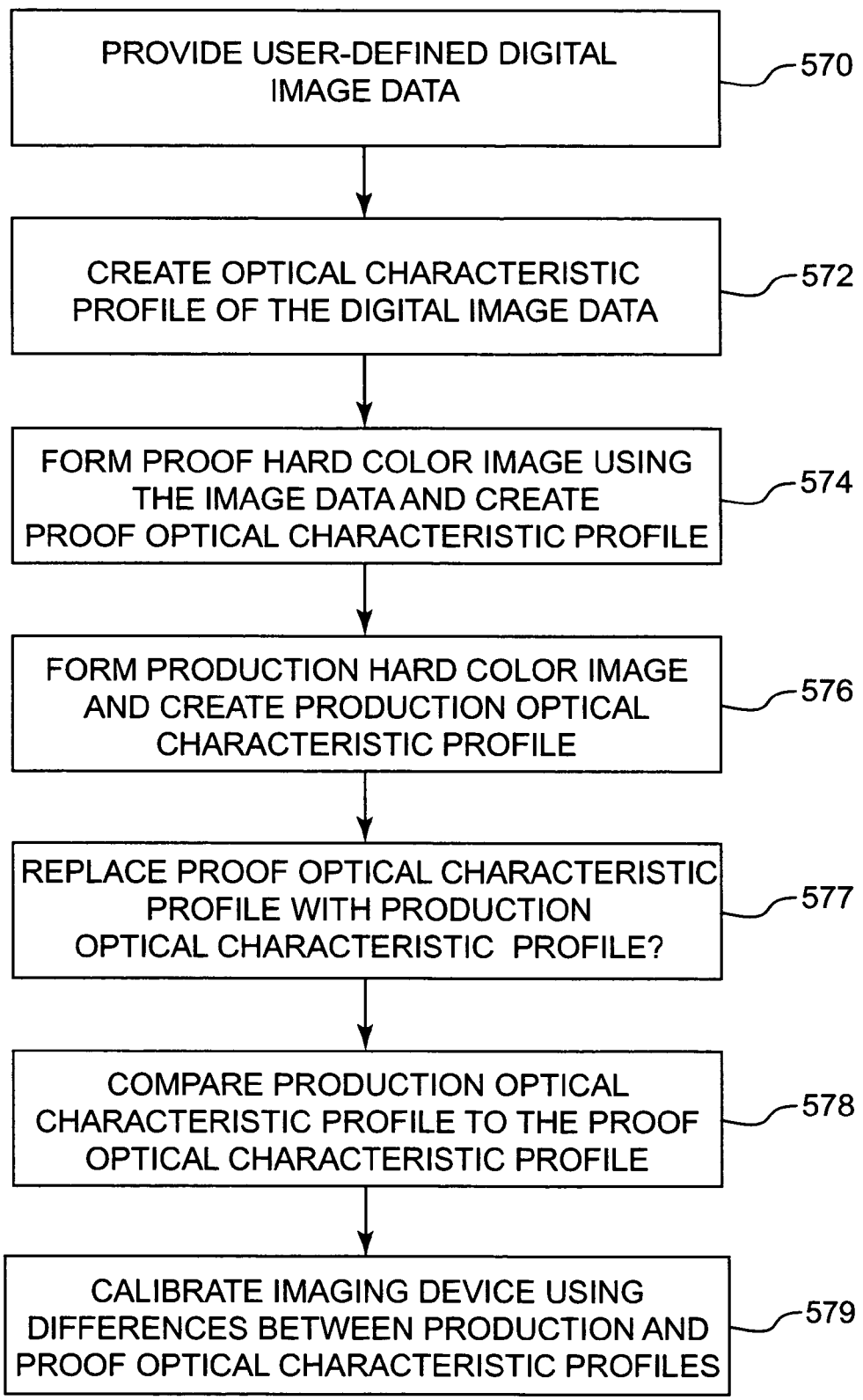
FIG. 7 is a flowchart of an exemplary method of providing relative color consistency in a print job.

Referring to FIG. 7, an exemplary method which may be performed with respect to imaging device 10 is shown. The depicted flow chart illustrates exemplary operations with respect to providing a relative color consistency.

At a step 570, user-defined digital image data is provided to an imaging device.

At a step 572, an optical characteristic profile of the digital image data is created, such as optical density profile.

At a step 574, a proof hard color image is formed by the imaging device using the user-defined digital image data and a proof optical characteristic profile is created therefrom.

At a step 576, a production hard color image is formed and production optical characteristic profile thereof is created.

At a step 577, the production optical characteristic profile optionally replaces the proof optical characteristic profile.

At a step 578, the production optical characteristic profile is compared to the proof optical characteristic profile.

At a step 579, differences between the production and proof optical characteristic profiles is used to adjust or calibrate the imaging device 10.

Absolute Color Consistency Applications

In one embodiment, the methods and apparatus described herein are used to provide an absolute color consistency, where colors are maintained relative to an absolute measure, and the imaging device is maintained within the color specification. Because colors are maintained relative to an absolute measure, no proof print is used.

As described above, job analysis of the user-defined digital image data determines the controllable and reliable locations of the image to be printed. If the controllable and reliable regions are not sufficient (e.g., scan paths 59 travel only over white regions), the absolute color consistency feature can be addressed in one or more of three ways: 1) in some print jobs, it may be possible to alter or shift the location of the image to provide sufficient controllable and reliable regions; 2) if the sensor assembly 30 is configured for movement in a direction transverse to the direction of media path 20, the location of sensors 54 can be optimized to provide sufficient controllable and reliable regions; or 3) calibration of the press can be delayed until a print job is presented that provides sufficient controllable and reliable regions (usually the press color profile does not drift during a one job run) or in case of variable data printing (personalization) a subsequent page provides sufficient controllable and reliable regions. If the controllable and reliable regions are sufficient, it means that enough information is extracted from the job to detect slight drifts in the press color profile which may immediately be corrected using digital and/or physical changes in the press (the calibration can be done, in some cases, in iterative mode). This will keep the press color profile (e.g., the CMYK color profile) within proper specifications. The frequency of press color profile calibration depends on the press color drift rate and the color specification. When the absolute calibration is active, all printed jobs will be within the color specification, even jobs between the press color calibrations. All job areas, including areas which are not located under one of the sensors 54, will be kept within the color specification.

The optical density profile based on the digital image data constitutes the absolute target. As production prints are produced, measured optical density profiles are compared against the absolute target in locations indicated by the job analysis. When the measured optical density starts to drift away from the target values, the color feedback mechanism is used to modify the color LUTs and/or the machine physical parameters. In one embodiment, a color consistency warning is issued when controlled colors are out of tolerance bounds. In one embodiment, a further warning is issued if and when the imaging device fails to adjust or calibrate the colors to bring them back within tolerances.

Beneficially, the color profile of the imaging device 10 may be determined and calibrated using the user-defined image data and the sensed optical characteristic, without the use of a predefined image whose only function is to calibrate the imaging device (e.g., a color calibration patch). In particular, in the pre-press job analysis, locations in the user-defined images are identified that provide a range of colors necessary for color-profiling and calibrating imaging device 10. The identified locations substitute for the predefined color calibration patch, and allow continuous or periodic machine profiling. In some implementations, a plurality of user-defined images or print jobs may be required to fully profile the imaging device 10.

Figure 8:
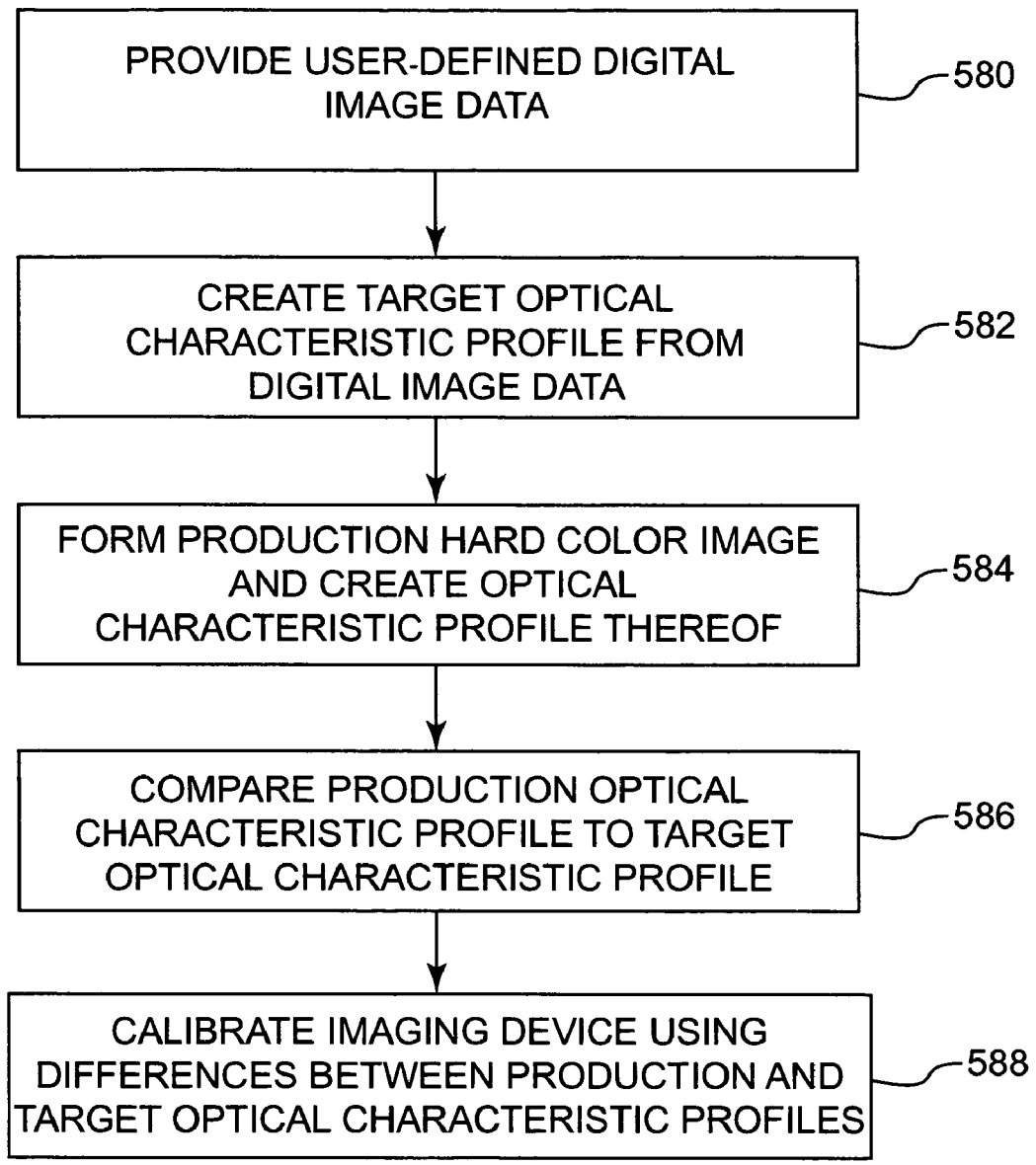
FIG. 8 is a flowchart of an exemplary method of providing absolute color consistency in a print job.

Referring to FIG. 8, an exemplary method which may be performed with respect to imaging device 10 is shown. The depicted flow chart illustrates exemplary operations with respect to providing an absolute color consistency.

At a step 580, user-defined digital image data is provided to an imaging device.

At a step 582, a target optical characteristic profile, such as an optical density profile, is created from the digital image data.

At a step 584, a production hard color image is formed and production optical characteristic profile thereof is created.

At a step 586, the production optical characteristic profile is compared to the target optical characteristic profile.

At a step 588, differences between the production and target optical characteristic profiles is used to adjust or calibrate the imaging device 10.

Color Consistency for Industrial Applications

In yet another embodiment, the methods and apparatus may be used to maintain a color or set of colors (e.g., key colors) absolutely or relative to a proof image across a plurality of jobs and/or across a plurality of imaging devices, as may be useful in industrial printing applications. An example of an industrial printing application is the reproduction of a company logo in a variety of print jobs (e.g., business cards, letterhead, advertising literature, etc.) and by a variety of imaging devices.

During the design stage of a color consistency job for an industrial application, the designer indicates key colors to be maintained. Key colors are common to a set of jobs (e.g. an advertisement campaign, or a set of company documents) and can be a logo, product, background or any other prevalent color in the set of jobs. The set of jobs is referred to herein as a campaign.

Preproduction job analysis determines locations where key colors are controllable. If one of the key colors is not controllable (e.g. it does not appear under any of the scan paths 59), a warning is generated. The designer must then either shift the image to put the uncontrolled key color under a scan path 59, or remove control of the key color for that particular job of the campaign (e.g., if the missing color does not appear in that job at all).

Control of the key colors may be either relative to a proof profile or an absolute profile. A proof profile is done once for all key colors in a campaign. If production prints are to be produced by imaging devices other than or in addition to the imaging device used to produce the proof image, the proof profile can be distributed to all such imaging devices. If the production imaging devices are at locations different from the location of the imaging device used to produce the proof image, the proof profile may be distributed to the production imaging devices by any suitable communication system, such as by transmission over the internet. In one embodiment, only key colors in a campaign are controlled. In another embodiment, key colors are controlled as described herein, while other colors are controlled with relative or absolute color consistency as described above. When control of key colors is combined with relative color consistency, the key colors are brought into the campaign proof bounds before the job proof and its associated optical density profile is saved. Optical density profiles for production prints are compared against the proof/absolute target in locations indicated by the job analysis. Those locations include all key colors and may or may not include other controllable colors. When the measured optical density drifts away from the target values, the color feedback mechanism is used to modify the color LUTs. In one embodiment, a color consistency warning is issued when controlled colors are out of tolerance bounds. In one embodiment, a further warning is issued if and when the imaging device fails to adjust or calibrate the colors to bring them back within tolerances.

Figure 9:
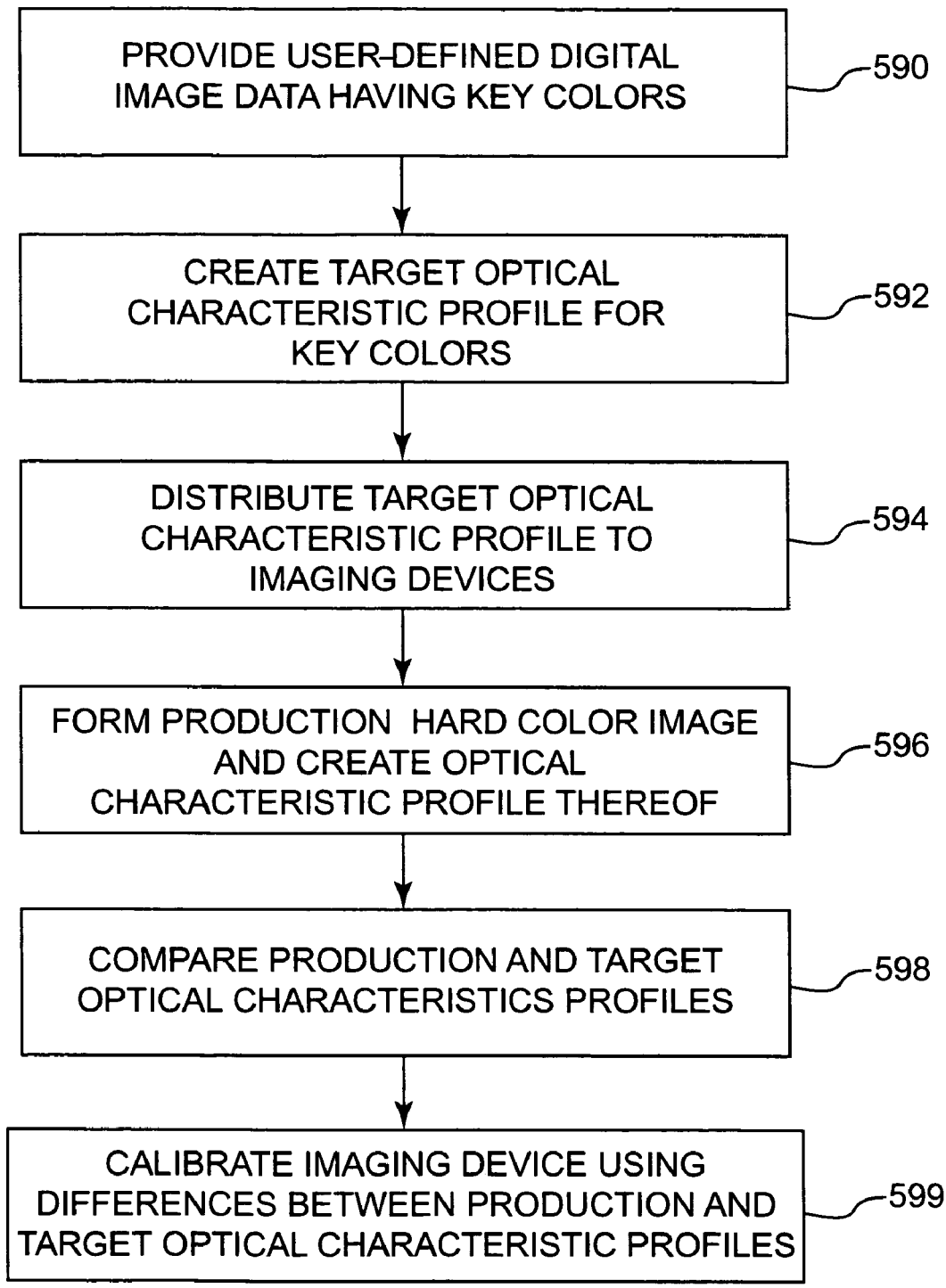
FIG. 9 is a flowchart of an exemplary method of providing color consistency across a variety of print jobs and imaging devices.

Referring to FIG. 9, an exemplary method which may be performed with respect to one or more imaging devices 10 is shown. The depicted flow chart illustrates exemplary operations with respect to providing color consistency in an industrial application.

At a step 590, user-defined digital image data having key colors is provided to an imaging device.

At a step 592, a target optical characteristic profile, such as optical density profile, of the key colors is created. The target optical characteristic profile of the key colors may be based on an absolute target, or relative to a proof image.

At a step 594, the target optical characteristic profile is optionally distributed to additional imaging devices.

At a step 596, a production hard color image is formed and production optical characteristic profile thereof is created.

At a step 598, the production optical characteristic profile is compared to the target optical characteristic profile.

At a step 599, differences between the production and target optical characteristic profiles is used to adjust or calibrate the imaging device 10.

Exemplary calibration operations of different operations of imaging device 10 with respect to imaging are described below. The calibration operations are for illustration purposes, and other calibration operations are possible.

As described above with respect to relative, absolute and industrial color consistency applications, output of sensors 54 is used to calibrate operations of imaging device 10 during imaging of images of a user job. Hard images of the job itself are used. For example, a plurality of copies of the same image of a user job may be formed upon a single sheet of media (e.g., labels, business cards, postcards, etc.) and different copies may be sensed by different ones of the sensors 54 (e.g., corresponding to the locations of the copies on the sheet of media 52). Processing circuitry 42 compares output of the appropriate sensors 54 which should be the same or similar in the described embodiment using copies of the same image, and adjusts or calibrates imaging operations if the results are outside of acceptable color consistency tolerances. For example, if different regions of a hard color image differ by an unacceptable amount, processing circuitry 42 may modify imaging operations such as modifying the image data and/or operations of image engine 14 in exemplary embodiments to improve color consistency.

As described herein, the imaging device calibration method continuously monitors an actual optical characteristic such as optical density of the hard color images as the images are formed. The method thereby provides improved color inconsistency of the hard color images: 1) across an individual page; 2) across consecutive pages on the same imaging device; 3) across a plurality of imaging devices of the same type; and 4) across imaging devices of different types and print technologies (as long as using the same sensor configuration).

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the mechanical, electro-mechanical, and electrical arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An imaging method comprising:
   forming a plurality of hard color images upon media with an imaging device using user-defined image data, the hard color images corresponding to the user-defined image data;
   sensing an optical characteristic of at least a portion of the hard color images at a plurality of different spatial locations of the hard color images, the optical characteristic corresponding to a color measurement of the hard color images;
   comparing the color measurement of the hard color images with a color profile of the user-defined image data; and
   calibrating an imaging operation of the imaging device with respect to forming the hard color images to maintain the color measurement of the hard color images within a tolerance level relative to the color profile,
   wherein comparing the color measurement of the hard color images with a color profile of the user-defined image data comprises one of identifying locations of the hard color images where measurement of the optical characteristic is substantially constant along one or more scan paths and identifying locations of the user-defined image data that provide a range of colors sufficient for color-profiling and calibrating of the imaging device.

2. The method of claim 1, wherein forming a plurality of hard color images upon media comprises replicating the plurality of hard color images on a single sheet of the media.

3. The method of claim 1, wherein forming a plurality of hard color images upon media comprises replicating the plurality of hard color images on a series of sheets of the media.

4. The method of claim 1, wherein forming a plurality of hard color images upon media comprises forming a series of different hard color images on a series of sheets of the media.

5. The method of claim 1, wherein sensing the optical characteristic of at least a portion of the hard color images and calibrating the imaging operation of the imaging device occurs during forming the plurality of hard color images upon media.

6. The method of claim 1, wherein sensing the optical characteristic of at least a portion of the hard color images comprises sensing the optical characteristic of each of the plurality of hard color images.

7. The method of claim 1, further comprising:
   designating one of the plurality of hard color images as a proof image;
   wherein sensing an optical characteristic of at least a portion of the hard color images comprises sensing the optical characteristic of the proof image and at least one other of the plurality of hard color images at a plurality of different spatial locations; and
   wherein comparing the color measurement of the hard color images with a color profile of the user-defined image data comprises comparing the color measurement of the at least one other of the plurality of hard color images with the color measurement of the proof image.

8. The method of claim 1, wherein the hard color images comprise a plurality of colored marking agents.

9. The method of claim 1, wherein sensing an optical characteristic comprises sensing optical density.

10. The method of claim 1, wherein calibrating an imaging operation of the imaging device comprises modifying at least one of a physical parameter of the imaging device and a machine look-up table (LUT).

11. An imaging device calibration method comprising:
    forming a plurality of hard color images upon media with an imaging device using user-defined image data;
    sensing an optical characteristic of a first of the plurality of hard color images, the optical characteristic corresponding to a color measurement of the first of the plurality of hard color images;
    sensing an optical characteristic of a second of the plurality of hard color images, the optical characteristic corresponding to a color measurement of the second of the plurality of hard color images; and
    calibrating an imaging operation of the imaging device with respect to forming the hard color images to maintain the color measurement of the first and second of the plurality of hard color images within tolerance levels relative to a color profile of the user-defined image data,
    wherein sensing the optical characteristic of the first and second of the plurality of hard color images comprises one of identifying locations of the hard color images where measurement of the optical characteristic is substantially constant along one or more scan paths and identifying locations of the user-defined image data that provide a range of colors sufficient for color-profiling and calibrating of the imaging device.

12. The method of claim 11, further comprising sensing an optical characteristic of each of the plurality of hard color images, and calibrating an imaging operation of the imaging device with respect to forming the hard color images using differences between the color measurement of at least two of the plurality of hard color images.

13. The method of claim 11, wherein sensing an optical characteristic comprises sensing an optical characteristic at a plurality of different spatial locations of the hard image.

14. The method of claim 11, wherein forming a plurality of hard color images upon media with an imaging device using user-defined image data comprises forming a first portion of the plurality of hard color images with a first imaging device, and forming a second portion of the plurality of hard color images with a second imaging device; and wherein sensing an optical characteristic of a first of the plurality of hard color images comprises sensing an optical characteristic of one of the first portion of hard color images, and sensing an optical characteristic of a second of the plurality of hard color images comprises sensing an optical characteristic of one of the second portion of hard color images;

and wherein calibrating an imaging operation comprises calibrating an imaging operation of at least one of the first and second imaging devices.

15. The method of claim 11, wherein forming a plurality of hard color images upon media with an imaging device using user-defined image data comprises forming the plurality of hard color images on a single sheet of media.

16. The method of claim 11, wherein calibrating an imaging operation of the imaging device with respect to forming the hard color images comprises calibrating an imaging operation of the imaging device using differences between the color measurement of the first and second of the plurality of hard color images.

17. The method of claim 11, wherein calibrating an imaging operation of the imaging device with respect to forming the hard color images comprises calibrating an imaging operation of the imaging device using differences between a color profile of the user-defined image data and at least one of the color measurements of the first and second of the plurality of hard color images.

18. The method of claim 11, wherein calibrating an imaging operation of the imaging device comprises modifying at least one of a physical parameter of the imaging device and a machine look-up table (LUT).

19. An imaging device comprising:
an image engine configured to provide a marking agent upon media in a media path of the imaging device to form a plurality of hard color images upon the media using user-defined image data;
a plurality of sensors positioned adjacent to the media path, each sensor configured to provide a signal regarding an optical characteristic of the plurality of the hard color images at a plurality of different spatial locations across the media, the optical characteristic corresponding to a color measurement of the hard color images; and
processing circuitry coupled with the sensors and configured to receive the signals, the processing circuitry further configured to compare the color measurement of the hard color images with a color profile of the user-defined image data and adjust an imaging operation of the imaging device with respect to the formation of others of the hard color images to calibrate the imaging device and maintain the color measurement of the hard color images within a tolerance level relative to the color profile,
wherein, to compare the color measurement of the hard color images with a color profile of the user-defined image data, the processing circuitry is configured to one of identify locations of the hard color images where measurement of the optical characteristic is substantially constant along one or more scan paths and identify locations of the user-defined image data that provide a range of colors sufficient for color-profiling and calibrating of the imaging device.

20. The imaging device of claim 19, wherein the sensors are spaced from one another in a scan direction extending across the media path.

21. The imaging device of claim 19, wherein the processing circuitry is configured to adjust the imaging operation to improve color consistency and uniformity of the others of the hard color images.

22. The imaging device of claim 19, wherein the processing circuitry is configured to continuously adjust the imaging operation to calibrate the imaging device and maintain the color measurement of the hard color images within a tolerance level relative to the color profile.

23. The imaging device of claim 19, wherein the plurality of sensors are selected from densitometers, photometers, and colorimeters.

24. The imaging device of claim 19, wherein the processing circuitry is configured to modifying at least one of a physical parameter of the imaging device and a machine look-up table (LUT) when adjusting an imaging operation of the imaging device.

* * * * *